United States Patent Office 3,778,424
Patented Dec. 11, 1973

---

3,778,424
PROCESS FOR THE PREPARATION OF
1,2-POLYBUTADIENE
Shotaro Sugiura and Haruo Ueno, Chiba, Minoru Kono, Ube, and Hisawaki Hamada, Ichihara, Japan, assignors to Ube Industries Ltd., Yamaguchi-ken, Japan
Filed Dec. 1, 1970, Ser. No. 94,019
Claims priority, application Japan, Dec. 2, 1969, 44/96,253, 44/96,254
Int. Cl. C08d 1/14, 1/34, 3/06
U.S. Cl. 260—94.3
7 Claims

ABSTRACT OF THE DISCLOSURE

A process for the preparation of 1,2-polybutadiene which comprises polymerizing 1,3-butadiene in the liquid phase in the presence of a catalyst composition composed of:

Figure 1:
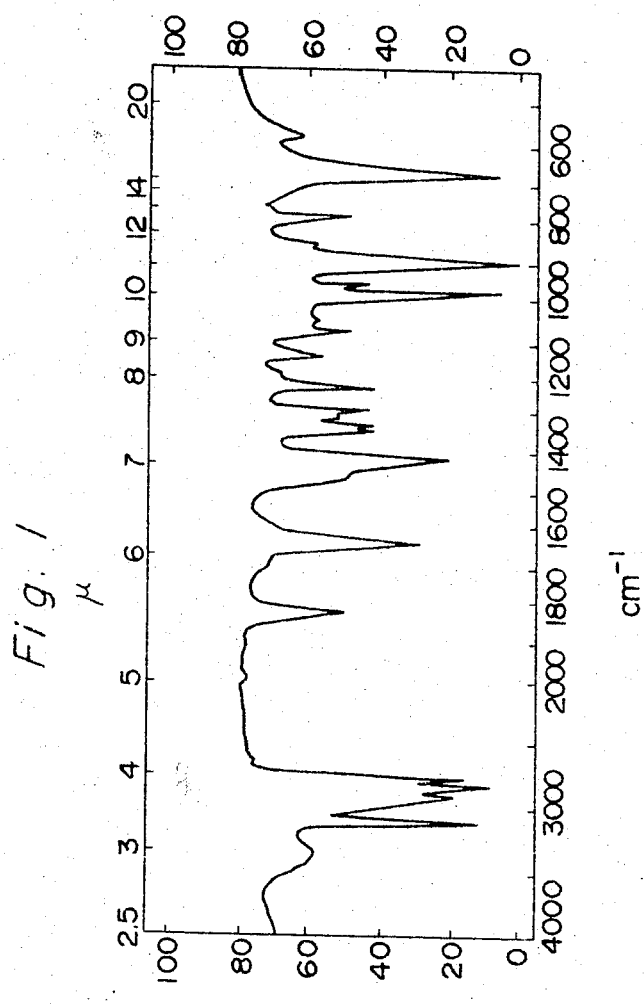

(a) a cobalt compound,
(b) an organoaluminum compound of the formula, $AlR_3$, in which R is a hydrocarbon radical of 1 to 6 carbon atoms, and
(c) carbon disulfide, and optionally
(d) a nitrile compound of the formula, $$R(CN)_n$$

in which R is an alkyl of 1 to 10 carbon atoms, an aralkyl of 7 to 10 carbon atoms, or an aryl of 6 to 12 carbon atoms, and $n$ is 1 or 2.

Syndiotactic 1,2-polybutadiene obtained from such process has an intrinsic viscosity $[\eta]$ measured in 135° C. Tetralin of at least 0.3, and a melting point measured with differential scanning calorimeter of at least 200° C.

---

This invention relates to a process for the preparation of 1,2-polybutadiene which comprises polymerization of 1,3-butadiene in the presence of novel catalyst composition, and also to the novel syndiotactic 1,2-polybutadiene so produced.

Briefly stated, the invention relates to a process for the preparation of 1,2-polybutadiene, which comprises polymerizing 1,3-butadiene in the liquid phase in the presence of a catalyst obtained from a soluble cobalt compound, an organoaluminum compound, and carbon disulfide. The 1,2-polybutadiene obtained by the subject process has a high melting point ranging from approximately 200 to 215° C., and also has high crystallinity.

Conventionally known catalysts for the preparation of high purity and highly crystalline 1,2-polybutadiene include those systems composed of a cobalt compound and trialkylaluminum; or of a cobalt compound, trialkylaluminum and dialkylaluminum monohalide (see U.S. Pat. No. 3,182,051).

According to the disclosure of such U.S. patent, the polybutadiene obtained by polymerizing 1,3-butadiene in the presence of such known catalysts possesses the syndiotactic 1,2-structure. The melting point of the syndiotactic 1,2-polybutadiene (primary transition temperature) is not given in the U.S. patent, but presumably is approximately 154° C., from the disclosure in column 2 of the specification of another U.S. Pat. No. 3,137,683 (owned by the same patentee as of U.S. Pat. No. 3,182,051). Validity of this presumption is also substantiated by the results of later given controls.

Use of the catalyst system composed of a cobalt compound and trialkylaluminum in the polymerization of 1,3-butadiene into 1,2-polybutadiene has not yet been successfully practiced on industrial scales, because, first the resulting 1,2-polybutadiene yield is considerably low, and second, the resulting 1,2-polybutadiene exhibits rather unsatisfactory physical properties.

We now discovered that, when 1,3-butadiene is polymerized in the liquid phase, in the presence of above-described novel catalyst composition composed of a soluble cobalt compound, an organoaluminum compound, and carbon disulfide, not only is 1,2-polybutadiene obtained at higher yield compared with the above-described prior art, but also the product has a melting point of approximately 200° C. or above, and excellent various physical properties.

That is, the melting point of the polybutadiene obtained by the subject process is not lower than 200° C., normally approximately 200° C. to 215° C., much higher than that of 1,2-polybutadiene prepared in the conventional manner.

Infrared absorption spectrum of the polybutadiene obtained by the subject process indicates a very high content of the 1,2-structure deemed to be syndiotactic. Also its X-ray diffraction pattern suggests very high crystallinity.

The polybutadiene prepared by the subject process therefore has high utility as a material for shaped articles, films, fibers, etc., due to its high melting point and high crystallinity. Also it is valuable as a component of graft-copolymers, because of the vinyl group contained therein.

Furthermore, because the 1,2-polybutadiene exhibits excellent solvent resistance in addition to the high melting point, it increases the commercial value of plastics.

According to one embodiment of the invention, a process for the preparation of 1,2-polybutadiene which comprises polymerizing 1,3-butadiene in the liquid phase, in the presence of a catalyst composition composed of:

(a) a cobalt compound,
(b) an organoaluminum compound of the formula $$AlR_3 \quad (1)$$

in which R is a hydrocarbon radical of 1–6 carbons, and
(c) carbon disulfide is provided.

As the cobalt compound, any that is soluble in inert organic solvents or liquid butadiene can be optionally selected. Preferred examples of such soluble cobalt compound include β-diketone complex of cobalt and β-keto-acid ester complex of cobalt. As the β-diketone, for example, those of the formula,

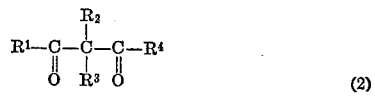

(2)

in which $R^1$ and $R^4$, which may be the same or different, are an arlkyl radical of up to 6 carbon atoms, and $R^2$ and $R^3$, which may be the same or different, are a hydrogen atom or an alkyl radical of up to 6 carbon atoms, can be employed. Also as the β-keto-acid ester, those of the formula,

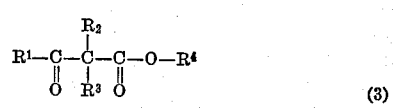

(3)

in which $R^1$ and $R^4$, which are the same or different, are an alkyl radical of up to 6 carbon atoms, and
$R^2$ and $R^3$, which are the same or different, are a hydrogen atom, or an alkyl radical of up to 6 carbon atoms, can be used.

Particularly preferred complexes are: cobalt (II) acetylacetonate, cobalt (III) acetylacetonate, and cobalt-acetoacetic acid ethyl ester complex.

It is also possible to use cobalt salts of organic carboxylic acids of at least 6 carbons, for example, cobalt octoate, cobalt naphthenate, etc., as the soluble cobalt compound.

Furthermore, as the soluble cobalt compound, there may be conveniently used halogenated cobalt complexes of (1) a halogenated cobalt of the formula $$CoX_n \quad (4)$$

in which X is a halogen atom, particularly preferably a chlorine atom, and $n$ is 2 or 3 with (2) a ligand capable of forming a complex with a halogenated cobalt, such as a tertiary amine, e.g., pyridine, triethylamine, tributylamine and dimethylaniline; an alcohol, e.g., methyl alcohol and ethyl alcohol; a tertiary phosphine; e.g., triphenyl phosphine and tributyl phosphine; a ketone, e.g., acetone; and an N,N-dialkylamide, e.g., N,N-dimethyl formamide, N,N-dimethyl acetamide and N,N-diethyl formamide. A particularly preferable example of the halogenated cobalt complex is a complex of cobalt chloride with pyridine or ethyl alcohol.

As the organoaluminum compound which is one of the constituents of the novel catalyst, those of the general formula $AlR_3$ (R standing for a hydrocarbon radical of 1–6 carbons, for example, alkyl, cycloalkyl, or aryl) can be used, the preferred compounds being trimethylaluminum, triethylaluminum, tributylaluminum, and triphenylaluminum.

Carbon disulfide as the third component of the catalyst is subject to no specific limitation, while that containing no water is preferred. In the subject process, presence of water in the catalyst and/or the polymerization system reduces the polymer yield. It is preferred for the increase in polymer yield, to prepare the catalyst in a solution of 1,3-butadiene in the polymerization solvent.

The quantities of the catalyst components suited for the subject process are: at least 0.0005 mol percent, preferably from 0.001 mol percent to 0.5 mol percent, to butadiene, of the cobalt compound; at least 0.05 mol percent, preferably 0.5 mol percent to 5 mol percent to the butadiene, of the organoaluminum compound; and at least 0.0005 mol percent, preferably at least 0.001 mol percent, to the butadiene, of carbon disulfide. When more than 1.0 mol percent to the butadiene, of carbon disulfide is used, the polybutadiene yield is reduced, although the melting point of the polybutadiene is substantially unchanged.

The catalyst composed of the specified three components not only exhibits markedly higher catalytic activity than that of conventional catalysts containing no carbon disulfide, i.e., those composed of cobalt compound and organoaluminum compound, but also gives 1,2-polybutadiene of higher melting point and higher crystallinity. Thus the catalyst is unique in those favorable properties.

It has been discovered that the polymer yield increases with the increase in the quantity of carbon disulfide in the catalyst up to a certain point, and past that the polymer yield decreases with further increase in carbon disulfide content. According to our studies such a phenomenon is unique to the catalyst system comprising the cobalt compound and organoaluminum compound as employed in the subject process. In all other known 1,2-polybutadiene-forming catalysts containing no cobalt compounds, i.e., those composed of chromium triacetylacetonate-triethylaluminum, nickel naphthenate-triethylaluminum, vanadium triacetylacetonate-triethylaluminum, etc., addition of carbon disulfide as the third catalytic component only reduces the polymer yield.

Also according to the disclosure of U.S. Pat. No. 3,182,051, the catalyst employed therein is useful for the formation of syndiotactic 1,2-polybutadiene when it is aged for not longer than an hour, but when the aging is prolonged over several hours, the catalyst gives cis-1,4-polybutadiene (see columns 2 and 3 of the specification of said U.S. patent).

In clear contrast thereto, the catalyst employed in the subject process gives high melting point polybutadiene of high 1,2-structure content, when the mixture of cobalt compound and organoaluminum compound is aged for several hours before the addition of carbon disulfide thereto, similarly to the case wherein no aging is effected.

The sequence of addition of catalyst components is not critical. Generally speaking, however, it is convenient to add a cobalt compound to 1,3-butadiene which may be optionally in the form of a solution in an organic solvent, and thereafter an organoaluminum compound and carbon disulfide are added to the system either simultaneously or one by one in optional order. It is also permissible to first add a cobalt compound, and then organoaluminum compound, to 1,3-butadiene which may be optionally in the form of an organic solvent, age the system, for example, at 10°–80° C. for 10–600 minutes, and thereafter add carbon disulfide.

The manner of polymerization is subject to no specific limitations, except that it should be performed in an inert atmosphere, e.g., in nitrogen current, in the presence of afore-specified catalyst, in the liquid phase. For instance, the polymerization of 1,3-butadiene may be performed in an inert organic solvent, or in liquid 1,3-butadiene serving as the medium.

It is normally preferred, however, to effect the polymerization of 1,3-butadiene in an inert organic solvent.

As such inert organic solvent, aromatic hydrocarbons, aliphatic hydrocarbons, alicyclic hydrocarbons, and halides of the foregoing are suitable. Particularly preferred solvents include benzene, toluene, chlorobenzene, cyclohexane and n-heptane.

A suitable polymerization temperature range is −20–80° C., particularly 5–50° C.

The polymerization pressure may be atmospheric or elevated.

In practicing the subject process, if an inert organic solvent is employed, the quantity of 1,3-butadiene to the solvent is not critical, although a normally preferred ratio of 5–30% by weight based on the weight of the solvent is employed.

The polymerization of 1,3-butadiene can be performed either batchwise or continuously, using known apparatus. The formed polymer can be easily isolated by, for example, inactivating and eliminating the catalyst through a treatment with alcohols, etc.

Thus, according to the process of this invention, syndiotactic 1,2-polybutadiene composed essentially of the recurring structural unit of the formula,

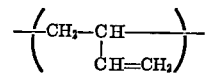

can be obtained. Such 1,2-polybutadiene normally possesses the melting point of at lowest 200° C., as measured with differential scanning calorimeter, which is extremely high compared with that of heretofore known syndiotactic 1,2-polybutadiene (approximately 154° C.). Furthermore, the syndiotactic 1,2-polybutadiene obtained by the subject process is substantially linear, in spite of the presence of vinyl radicals as side chains. The same 1,2-polybutadiene has an intrinsic viscosity $[\eta]$ as measured in 135° C. Tetralin of at least 0.3, preferably within the range of 0.5 to 3.0. Thus the polymer has the degree of polymerization sufficient for forming plastic shaped products, films, and fibers.

For a better understanding of the present invention, the attached drawings may be conveniently referred to.

Figure 2:
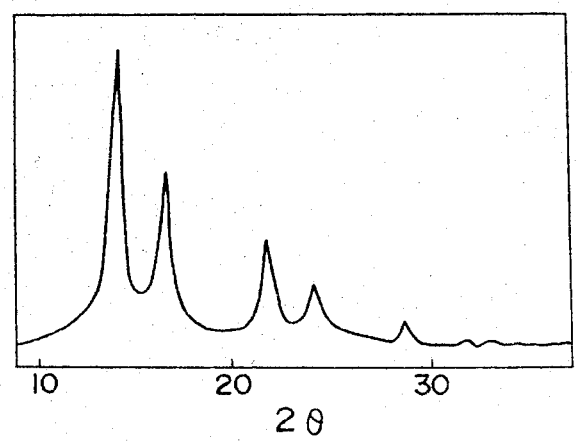
Figure 3:
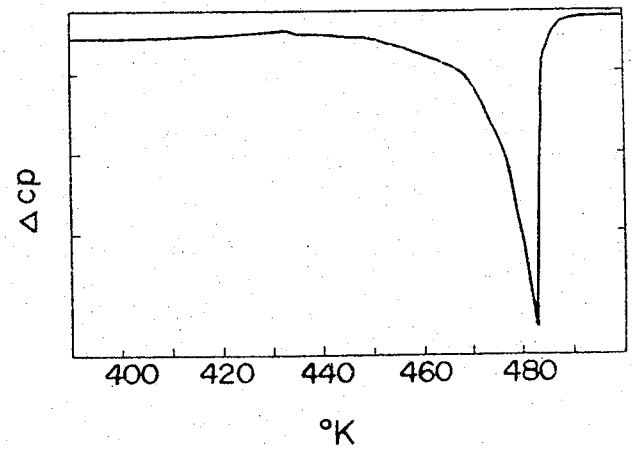
Figure 4:
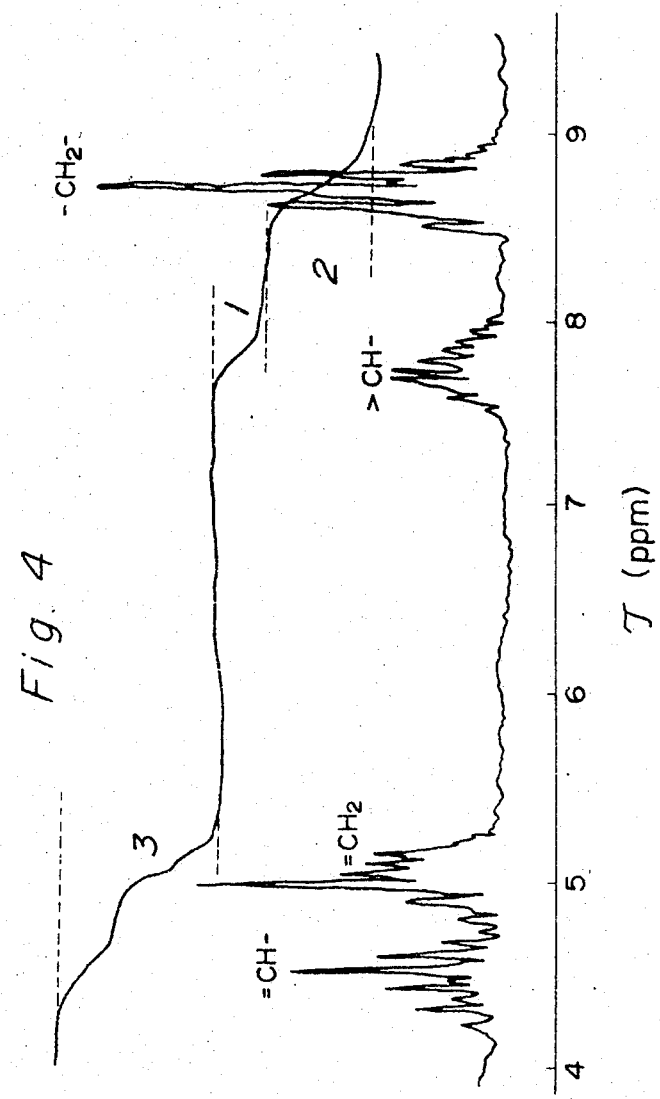
Figure 5:
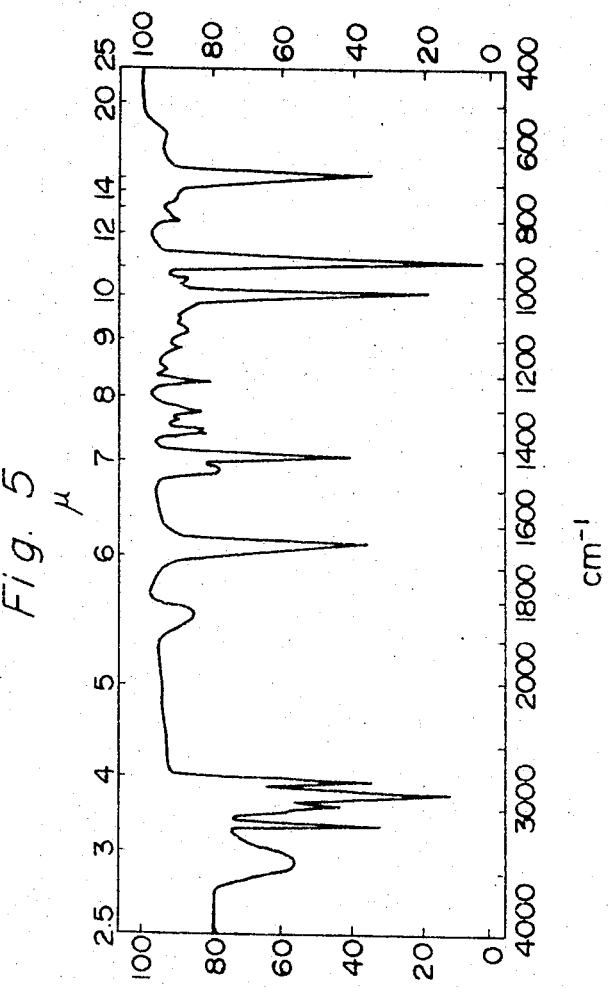
Figure 6:
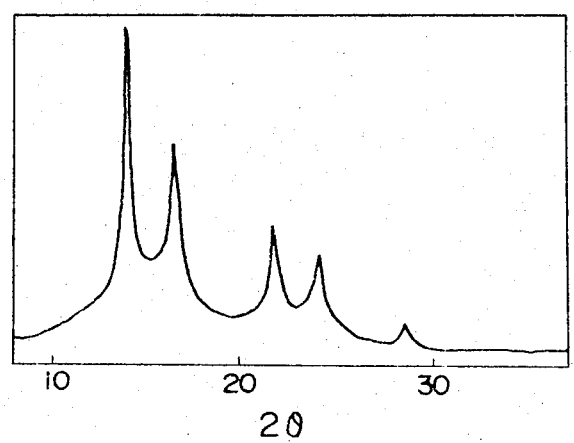
Figure 7:
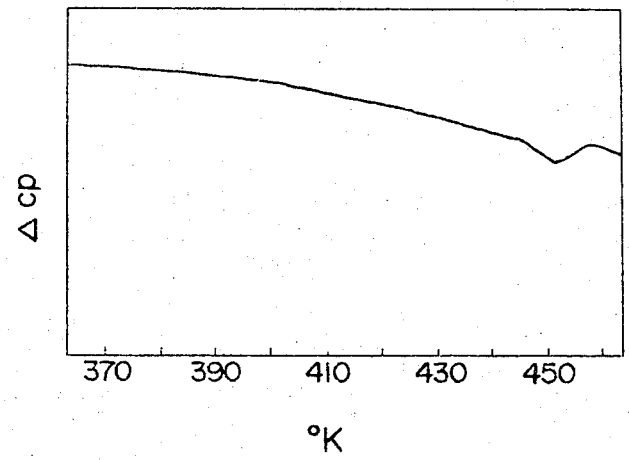

In the drawings:

FIG. 1 shows the infrared absorption spectrum of a syndiotactic 1,2-polybutadiene obtained in accordance with the subject process (product of Example 1), FIG. 2 shows the X-ray (Cu-$K_\alpha$) diffraction pattern of the same 1,2-polybutadiene, FIG. 3 shows the differential scanning calorimeter curve of the same 1,2-polybutadiene, FIG. 4 shows differential and integral curves of nuclear magnetic resonance absorption of the same 1,2-polybutadiene, FIG. 5 is the infrared absorption spectrum of another syndiotactic 1,2-polybutadiene within the scope of this invention (product of Example 16), FIG. 6 is the X-ray (Cu-$K_\alpha$) diffraction pattern of the 1,2-polybutadiene obtained in Example 16, and FIG. 7 is the differential scanning calorimeter curve of the same 1,2-polybutadiene obtained in Example 16.

That is, as is clearly visible in the chart of infrared absorption spectra of FIG. 1, the 1,2-polybutadiene in accordance with the subject invention has remarkable absorption at 660 cm.$^{-1}$, which is characteristic to syndiotactic 1,2-polybutadiene.

Furthermore, the X-ray diffraction pattern of FIG. 2 clearly demonstrates that the polymer has the crystalline peak characteristic to syndiotactic 1,2-polybutadiene at:

$2\theta$ 14.0
16.5
21.5
24.0

The chart of FIG. 3 again clearly demonstrates that the 1,2-polybutadiene in accordance with the invention has a conspicuous endothermic peak at temperatures not lower than 200° C., which occurs with melting of the polymer.

The fact that the syndiotactic 1,2-polybutadiene in accordance with the present invention contains no bridged or cyclized structure, although its melting point is as high as 200° C. or above, can be confirmed with the nuclear magnetic resonance absorption curves (NMR). That is, the results of measurement, with a high resolution NMR measuring apparatus, of O-dichlorobenzene solution of the polymer as the sample is shown in the chart of FIG. 4. The integrated intensities of the peaks characteristic to the specified radicals are shown in Table 1 below.

TABLE 1
[Integrated intensity of 1,2-polybutadiene]

| Integrated intensity ratio of main chain section | | Integrated intensity ratio of side chain and main chain section | |
|---|---|---|---|
| >CH— | >CH$^2$ | —CH=CH$^2$ | —CH—CH$^2$— |
| 1 | 2 | 3 | 3 |

That is, the ratio of integrated intensity of the signal due to >CH$_2$ proton in the main chain to that of the signal due to >CH— proton in the main chain is 2:1, and the integrated intensity ratio between the protons of side chain double bond, —CH=CH$_2$, and main chain >CH—CH$_2$— is 1:1. This well corresponds to the integrated intensity ratio obtained when the signals of main chain section and side chain section in FIG. 4 are enlarged 3 times, taking the allowable error for NMR into consideration. Those results indicate that the product of the subject process is 100% linear 1,2-polybutadiene, and is not bridged or cyclized.

The 1,2-polybutadiene obtained from the process of this invention is completely insoluble, at room temperature, in benzene, acetone, ethyl ether, n-heptane, cyclohexane, chloroform, carbon tetrachloride, acetonitrile, nitrobenzene, toluene, and Tetralin. Thus the polymer exhibits entirely different solvent-solubility from that of the polymer disclosed in U.S. Pat. No. 3,182,052.

The novel 1,2-polybutadiene produced in accordance with the invention is valuable as the material of films, fibers, and many other shaped products, because of its unique properties such as high melting point, high crystallinity and excellent solvent resistance. Furthermore, the polymer exhibits markedly better mechanical properties, particularly impact strength, compared with such resins as polypropylene.

Again, the polybutadiene produced by the subject process possesses vinyl radical side chains, and consequently shows remarkably improved surface characteristics over those of polyolefin resins, i.e., printability, adherability and platability. The vinyl radical side chains present in the 1,2-polybutadiene also conveniently allow the post treatment of the polymer such as crosslinking, graft-polymerization, etc.

According to another embodiment of the invention, a process for the preparation of 1,2-polybutadiene which comprises polymerizing 1,3-butadiene in the liquid phase in the presence of a catalyst composition composed of:

(a) a cobalt compound,
(b) an organoaluminum compound of the formula, AlR$^3$
  in which R is a hydrocarbon radical of 1 to 6 carbons,
(c) carbon disulfide, and
(d) a nitrile compound of the formula, $R(CN)_n$ in which R is an alkyl of 1 to 10 carbons, an aralkyl of 7 to 10 carbons, or an aryl of 6 to 12 carbons, and $n$ is 1 or 2, is provided.

In the above embodiment of this invention, a four-component catalyst composition is formed, by further adding an organonitrile compound to the already described three components, i.e., cobalt compound, organo-aluminum compound and carbon disulfide. That is, we discovered that with the addition of an organonitrile compound to the aforesaid three-component catalyst composition, the melting point of the product syndiotactic 1,2-polybutadiene can be freely controlled to the desired value, within the wide range of from approximately 100° C. to 210° C., in accordance with the added quantity of the nitrile compound.

The cobalt compound and organoaluminum compound similar to those which are useful for the aforesaid three-component catalyst composition are also usable in such four-component catalyst.

The organonitrile compounds which are useful as the fourth component of the catalyst are represented by the formula, $R(CN)_n$, R being an alkyl of 1 to 10 carbons, an aralkyl of 7 to 10 carbons, or an aryl of 6 to 12 carbons, and $n$ being 1 or 2. Specific examples include acetonitrile, propionitrile, adiponitrile, sebaconitrile, benzalnitrile, benzylnitrile, etc.

Preparation of the catalyst is preferably performed in a solution of 1,3-butadiene in the polymerization solvent, so as to increase the polymer yield. The order of addition of the components is not critical, as long as the nitrile compound is added before carbon disulfide.

According to a most preferred embodiment, first the cobalt compound and organoaluminum compound are added to the aforesaid butadiene solution and mixed, and thereafter the nitrile compound and carbon disulfide are added to the catalyst system by the order stated.

The adequate quantities of the catalytic components for the subject process are as follows: based on the butadiene, at least 0.0005 mol percent, preferably 0.001 to 0.5 mol percent, of the cobalt compound; at least 0.05 mol percent, preferably 0.5 to 5 mol percent, of the organoaluminum compound, and at least 0.0005 mol percent, preferably at least 0.001 mol percent, of carbon disulfide. When the quantity of carbon disulfide exceeds 1.0 mol percent based on the butadiene, the polybutadiene yield is reduced. The nitrile compound content in the catalyst is variable, in accordance with the desired proprties (particularly melting point) of the product polybutadiene. Generally speaking, however, it is convenient to use the nitrile compound in a quantity based on 10 mol percent to the butadiene.

The polymerization conditions may be identical with those of the first embodiment, except that the specified four-component catalyst composition is employed.

According to this latter embodiment of the invention, syndiotactic 1,2-polybutadiene having a melting point at a desired temperature between 100 to 210° C. is obtained.

FIGS. 5 to 7 show the infrared spectrum, the X-ray diffraction pattern and the differential scanning calorimeter curve of the syndiotactic-1,2-polybutadiene prepared according to the method of Example 16 by employing a nitrile as the fourth catalyst component. As is seen from FIGS. 5 to 7, the 1,2-polybutadiene prepared by this method has a structure quite similar to that of 1,2-polybutadiene prepared without using a nitrile while the melting point of the former is lower than that of the latter.

The 1,2-polybutadiene prepared in accordance with this embodiment exhibits increasingly greater solvent-solubility with the lowering in melting point. For instance, the polybutadiene having a melting point at 182° C. is soluble in carbon disulfide by less than 1%, but the solubility of the polybutadiene melting at 130° C. in carbon disulfide is approximately 14%.

The polymers produced by this embodiment are useful as shaping or coating polymers.

The invention will be hereinafter explained in further detail with reference to the working examples.

In the following examples and controls, the micro structures of polybutadienes were determined with KBr tablet, by infrared absorption spectrum analysis [R. Hampton, Analytical Chemistry, 21, 923 (1949)]. The melting points of polybutadienes were the peak temperatures of heat absorption curves drawn by differential scanning calorimeter (DSC). The intrinsic viscosity of each polymer was measured in 135° C. Tetralin.

The physical properties of 1,2-polybutadienes were measured as follows. The polybutadiene was hot-compressed at 230° C. for 10 minutes under a pressure of 300–350 kg./cm.$^2$, to be shaped into 0.1-mm. thick sheet, and its tensile strength, tear strength, and elongation were determined. The tensile strength was measured with respect to a sheet of 5.0 mm. x 50 mm. in size, at a pulling rate of 50 mm./min. under a temperature of 25°– 30° C. The tear strength was measured as to the polybutadiene sheet of 0.1 mm. x 10 mm. x 20 mm., by simple extension-tearing method under the same conditions as employed for tensile strength measurement. The elongation was measured as to the same polybutadiene sheet of 0.1 mm. x 5.0 mm. x 10.0 mm., the elongation to the original length being expressed by percentile value.

EXAMPLES 1–6

In a 500-cc. capacity glass separable flask of which the inside atmosphere had been nitrogen-substituted, a solution of 25 g. of 1,3-butadiene in 350 cc. of dehydrated benzene was poured, and to which 0.05 mmol of cobalt octoate and 2.5 mmols of triethylaluminum were added. Then carbon disulfide of the quantity varied in each run as specified in Table 2 was added, followed by 15 minutes' stirring at 30° C., to allow polymerization of the 1,3-butadiene. The reaction liquid was added to 200 cc. of methanol containing 1% of phenyl-$\beta$-naphthylamine, to cause precipitation of the polymer. The separated polymer was washed with methanol, and dried in vacuo at room temperature. The product became 100% powdery polymer. The yield, intrinsic viscosity, melting point and 1,2-structure content of the polymer of each run are shown in Table 2.

The mechanical properties of the 1,2-polybutadiene obtained in Example 1 were as follows:

Tensile strength, kg./cm.$^2$ _____ 430
Tear strength, kg./cm. _____ 46
Elongation, percent _____ 20

TABLE 2

| Example No. | Quantity of carbon disulfide (mmol) | Polymer yield (percent) | Melting point by DSC (° C.) | Intrinsic viscosity [$\eta$] | 1,2-structure content (percent) |
|---|---|---|---|---|---|
| 1 | 0.42 | 51 | 210 | 1.3 | <98.5 |
| 2 | 0.017 | 5 | | | <98.5 |
| 3 | 0.042 | 19 | 204 | 1.2 | <98.5 |
| 4 | 0.17 | 29 | 205 | 1.1 | <98.5 |
| 5 | 0.84 | 50 | 206 | 0.9 | <98.5 |
| 6 | 2.5 | 20 | 205 | 0.8 | <98.5 |

EXAMPLE 7

Example 1 was repeated except that the quantity of cobalt octoate was altered to 0.03 mmol, and 1,2-polybutadiene was obtained at a yield of 48%. The polymer had a melting point of 210° C., an intrinsic viscosity [$\eta$] of 1.9, and 1,2-structure content of not less than 98.5%.

The 1,2-polybutadienes obtained in Examples 5 and 7, and commercial polyproylene were extrusion molded at 230° C. for 2 minutes, at a pressure of 100 kg./cm.$^2$ into sheets. The results of property measurements as to said sheets are given in Table 3 below.

TABLE 3

| Test item (unit) | Test method | Polypropylene | 1,2-polybutadiene of— Ex. 5 | Ex. 7 |
|---|---|---|---|---|
| Tensile strength at yield point (kg./cm.$^2$) | ASTM-D412, ASTM-D638 | 313.5 | 274.0 | |
| Tensile elongation at yield point (percent) | | 13.7 | 36.1 | |
| Tensile strength at breaking point (kg./cm.$^2$) | | <290 | 307.3 | 368.0 |
| Tensile elongation at breaking point (percent) | | <600 | 182.8 | 40.4 |
| Initial modulus (kg./cm.$^2$) | | 9,400 | 5,200 | 5,800 |
| Compression modulus of elasticity | ISO rating 747 | 7,000 | 3,330 | 4,230 |
| Flexal strength (kg./cm.$^2$) | ASTM-D747 | 477 | 244 | 312 |
| Flexal elasticity (kg./cm.$^2$) | ASTM-D747 | 16,600 | 5,170 | 7,870 |
| Impact strength [a] (kg.cm./cm.$^2$) | ASTM-D256-56 | 5.04 | 60.5 | 20.2 |
| Rockwell hardness (R.60 kg. ½ inch) | ASTM-D785 | 113.4 | 92.5 | 95.7 |
| Thermal distortion temp. (fever stress) (° C.) | 18.5 kg | 68.8 | 52.6 | 57.0 |
| Plating property (adhesion strength) (kg./inch) | [b] | <0.2 | 9.93 | 4.97 |

[a] Izod impact test of notched piece.
[b] The adhesion strength was determined as follows: the 150 x 150 x 2 mm. sheet shaped as already described was etched in a dichromic acid solution for 15 minutes to cause chemical copper plating, and the peeling strength of the coating was measured with Shimazu Autograph IS-200 model tester at a pulling rate of 30 mm./min.

EXAMPLES 8–10

1,2-polybutadienes were prepared in the manner similar to Example 1, except that the quantity of carbon disulfide added was 0.17 mmol, and that of cobalt octoate was varied in each run as shown in Table 4. In all of Examples 8 through 10, the 1,2-structure content of the product polymers was not less than 98.5%. The yield, melting point, and intrinsic viscosity of the formed 1,2-polybutadiene in each run are also shown in Table 4.

TABLE 4

| Example No. | Quantity of cobalt octoate (mmol) | Polymer yield (percent) | Melting point by DSC (° C.) | Intrinsic viscosity [$\eta$] |
|---|---|---|---|---|
| 8 | 0.025 | 19 | 205 | 1.3 |
| 9 | 0.07 | 44 | 205 | 1.2 |
| 10 | 0.1 | 53 | 204 | 1.0 |

EXAMPLE 11

Example 1 was repeated except that the cobalt octoate was replaced by 0.05 mmol of cobalt acetylacetonate. A polybutadiene having a melting point of 205° C. and 1,2-structure content of not less than 98.5% was obtained with a yield of 47%.

In the same table, the results of a similar experiment except that the addition of acetonitrile was omitted are given for referential purpose.

TABLE 5

| Example number | Quantity of aceto-nitrile (mmol) | Polymer yield (percent) | 1,2-struc-ture content (percent) | Melting point (° C.) | Intrin-sic vis-cosity [η] | Tensile strength (kg./cm.²) | Elonga-tion (percent) | Tear strength (kg./cm.) |
|---|---|---|---|---|---|---|---|---|
| Control | 0 | 56 | 98.5 | 205 | 1.00 | 350~450 | 20 | 46 |
| 15 | 1.9 | 19 | 98.0 | 190 | 0.83 | 340 | 25 | 80 |
| 16 | 3.9 | 14 | 96.0 | 182 | 0.72 | 300 | | 88 |
| 17 | 5.7 | 23 | 86.0 | 169 | 0.58 | 230 | 30 | 80 |
| 18 | 9.7 | 35 | | 143 | 0.47 | 150 | 90 | 75 |
| 19 | 19.1 | 23 | 81.7 | 125 | 0.44 | 120 | 300 | 70 |
| 20 | 34.2 | 14 | | 110 | 0.40 | 115 | 350 | 69 |

EXAMPLE 12

Example 1 was repeated except that the cobalt octoate was replaced by 0.05 mmol of cobalt naphthenate. Thus a polybutadiene having a melting point of 205° C., and 1,2-structure content of not less than 98.5% was obtained with a yield of 45%.

EXAMPLE 13

Example 1 was repeated except that the cobalt octoate was replaced by 0.05 mmol of cobalt chloride-pyridine complex ($CoCl_2$-2 py). A polybutadiene having a melting point of 202° C., and 1,2-structure content of not less than 98.5% was obtained with a yield of 38%.

EXAMPLE 14

Example 1 was repeated except that the cobalt octoate and triethylaluminum were stirred in 100 cc. of benzene for 5 hours, added to the 1,3-butadiene solution, and carbon disulfide was then added to the system preceding three hours' of polymerization. A polybutadiene having a melting point of 207° C. and 1,2-structure content of not less than 98.5% was obtained with a yield of 14%.

CONTROL 1

Example 1 was repeated except that no carbon disulfide was used. No polybutadiene was formed. When the polymerization time was prolonged to 24 hours, a polybutadiene was obtained with a yield of 2.1%, which had a melting point of 152° C. as measured with DSC.

CONTROL 2

Example 1 was repeated except that the use of carbon disulfide was omitted, and the polymerization of 1,3-butadiene was continued for 16 hours in the presence of a catalyst prepared from 0.84 mmol of cobalt acetylacetonate and 16 mmols of triethylaluminum. A polybutadiene melting at 154° C. was obtained with a yield of 3%.

CONTROL 3

Above Control 2 was repeated except that the quantity of cobalt acetylacetonate was reduced to 0.03 mmol. A polybutadiene melting at 155° C. was obtained with a yield of 2%.

EXAMPLES 15–20

In 200 cc. of dehydrated benzene in a 500-cc. capacity glass separable flask of which the inside atmosphere had been nitrogen-substituted, 31 g. of 1,3-butadiene was dissolved. To the solution then 0.05 mmol of cobalt octoate and 3 mmols of triethylaluminum were added. Thereafter acetonitrile of the quantity specified in Table 5 below and and 1.6 mmols of carbon disulfide were added in the order stated. The 1,3-butadiene was allowed to polymerize at 30° C. for 60 minutes under stirring. Thus formed reaction liquid was poured into 200 cc. of methanol containing 1% of phenyl - β - naphthylamine, to cause precipitation of the polymer. The separated polymer was washed with methanol and dried in vacuo at room temperature, to be made into 100% powdery polymer. The yield, intrinsic viscosity, and 1,2-structure content of the polymer obtained in each run were as shown in Table 5.

EXAMPLE 21

Example 15 was repeated except that the acetonitrile was replaced by 5 mmols of benzylnitrile. A polybutadiene melting at 177° C. and containing 86.0% of 1,2-structure was obtained with a yield of 20%.

EXAMPLE 22

Example 15 was repeated except that the acetonitrile was replaced by 5 mmols of sebaconitrile. A polybutadiene melting at 162° C. and containing 89% of 1,2-structure was obtained with a yield of 18%.

EXAMPLE 23

Example 15 was repeated except that the acetonitrile was replaced by 5 mmols of adiponitrile. A polybutadiene melting at 176° C. and containing 82% 1,2-structure was obtained with a yield of 14%.

EXAMPLE 24

Example 15 was repeated except that the acetonitrile was replaced by 5 mmols of benzonitrile. A polybutadiene melting at 175° C. and containing 83% of 1,2-structure was obtained with a yield of 16%.

EXAMPLE 25

Example 17 was repeated except that the cobalt octoate was replaced by 0.05 mmol of cobalt acetylacetonate. A polybutadiene melting at 170° C. and containing 86% of 1,2-structure was obtained with a yield of 18%.

When the use of acetonitrile was omitted in the same run, a polybutadiene melting at 204° C. and containing 98.5% of 1,2-structure was obtained with a yield of 41%.

EXAMPLE 26

Example 17 was repeated except that the cobalt octoate was replaced by 0.05 mmol of cobalt naphthenate. A polybutadiene melting at 166° C. and containing 82% of 1,2-structure was obtained with a yield of 15%.

When the use of acetonitrile was omitted in the same run, a polybutadiene melting at 205° C., containing 98.5% of 1,2-structure was obtained with a yield of 40%.

EXAMPLE 27

Example 17 was repeated except that the cobalt octoate was replaced by 0.05 mmol of cobalt chloride-pyridine complex. A polybutadiene melting at 160° C., and containing 79% of 1,2-structure was obtained with a yield of 13%.

When the use of acetonitrile was omitted in the same run, a polybutadiene melting at 202° C., and containing 98.5% of 1,2-structure was obtained with a yield of 35%.

EXAMPLE 28

Example 17 was repeated except that the order of addition of acetonitrile and triethylaluminum was reversed. A polybutadiene melting at 157° C., and containing 86% of 1,2-structure was obtained with a yield of 10%.

EXAMPLE 29

Example 15 was repeated except that the triethylaluminum was added last. A polybutadiene melting at 188° C. was obtained with a yield of 3.2%.

What is claimed is:

1. A process for the preparation of 1,2-polybutadiene which comprises polymerizing 1,3-butadiene in the liquid phase in the presence of a catalyst composition consisting essentially of:
   (a) a cobalt compound selected from the group consisting of
      (i) a β-diketone complex of cobalt,
      (ii) a β-keto-acid ester complex of cobalt,
      (iii) a cobalt salt of an organic carboxylic acid of at least 6 carbon atoms, and
      (iv) a complex of a halogenated cobalt compound of the formula $$CoX_n$$

in which X is a halogen atom and $n$ is 2 or 3, with a member selected from the group consisting of tertiary amines, alcohols, tertiary phosphines, ketones and N,N-dialkylamides,
   (b) an organoaluminum compound of the formula $$AlR_3$$

in which R is a hydrocarbon radical of 1 to 6 carbon atoms, and
   (c) carbon disulfide.

2. A process for the preparation of 1,2-polybutadiene which comprises polymerizing 1,3-butadiene in the liquid phase in the presence of a catalyst composition consisting essentially of:
   (a) a cobalt compound selected from the group consisting of
      (i) a β-diketone complex of cobalt,
      (ii) a β-keto-acid ester complex of cobalt,
      (iii) a cobalt salt of an organic carboxylic acid of at least 6 carbon atoms,
      (iv) a complex of a halogenated cobalt compound of the formula $$CoX_n$$

in which X is a halogen atom and $n$ is 2 or 3, with a member selected from the group consisting of tertiary amines, alcohols, tertiary phosphines, ketones and N,N-dialkylamides,
   (b) an organoaluminum compound of the formula $$AlR_3$$

in which R is a hydrocarbon radical of 1 to 6 carbon atoms,
   (c) carbon disulfide, and
   (d) a nitrile compound of the formula $$R(CN)_n$$

in which R is an alkyl group of 1 to 10 carbon atoms, an aralkyl group of 7 to 10 carbon atoms, or an aryl group of 6 to 12 carbon atoms, and $n$ is 1 or 2.

3. The process of claim 1 wherein the catalyst components are present in the following amounts based upon the weight of the butadiene:
   (a) cobalt compound—at least 0.0005 mol percent,
   (b) organoaluminum compound—at least 0.05 mol percent, and
   (c) carbon disulfide—at least 0.0005 mol percent.

4. The process of claim 2 wherein the catalyst components are present in the following amounts based upon the weight of the butadiene:
   (a) cobalt compound—at least 0.0005 mol percent,
   (b) organoaluminum compound—at least 0.05 mol percent,
   (c) carbon disulfide—at least 0.0005 mol percent, and
   (d) nitrile compound—0.0005 to 10 mol percent.

5. The process of claim 1 wherein the catalyst components are present in the following amounts based upon the butadiene:
   (a) cobalt compound—0.001 to 0.5 mol percent,
   (b) organoaluminum compound—0.5 to 5.0 mol percent, and
   (c) carbon disulfide—0.001 to 1.0 mol percent.

6. The process of claim 2 wherein the catalyst components are present in the following amounts based upon the butadiene:
   (a) cobalt compound—0.001 to 0.5 mol percent,
   (b) organoaluminum compound—0.5 to 5.0 mol percent,
   (c) carbon disulfide—0.001 to 1.0 mol percent, and
   (d) nitrile compound—0.0005 to 10 mol percent.

7. The process of claim 1 wherein the polymerization is carried out at a temperature within the range of from −20° C. to 80° C.

References Cited

UNITED STATES PATENTS 3,300,466  1/1967  Marullo et al. _____ 260—94.3
3,232,920  2/1966  Naylor _____ 260—94.3

JOSSEPH L. SCHOFER, Primary Examiner

W. F. HAMROCK, Assistant Examiner

U.S. Cl. X.R.

260—94.2 R, 94.4, 94.6